United States Patent [19]

Tsukioka

[11] Patent Number: 4,879,242

[45] Date of Patent: Nov. 7, 1989

[54] METHOD OF SYRINGING REACTION BEAD IN EXAMINATION OF BLOOD OR THE LIKE AND APPARATUS THEREOF

[76] Inventor: Yasunobu Tsukioka, 1389-33, Tsurugasone, Yashio-shi, Saitama-ken, Japan

[21] Appl. No.: 4,146

[22] Filed: Jan. 16, 1987

[30] Foreign Application Priority Data

Nov. 18, 1986 [JP] Japan ............................. 61-274968

[51] Int. Cl.$^4$ ........................................... G01N 35/00
[52] U.S. Cl. ..................................... 436/54; 436/180; 422/81; 422/63
[58] Field of Search .................. 422/81, 100, 69, 101, 422/73, 65, 63; 436/54, 178, 180, 807, 810

[56] References Cited

U.S. PATENT DOCUMENTS

| | | | |
|---|---|---|---|
| 3,716,338 | 2/1973 | Moran | 422/65 |
| 4,366,119 | 12/1982 | Takeuchi | 422/65 |
| 4,730,631 | 3/1988 | Schwartz | 422/63 |

FOREIGN PATENT DOCUMENTS 0080134 11/1982 European Pat. Off. .

Primary Examiner—Barry S. Richman
Assistant Examiner—Lyle Alfandary-Alexander
Attorney, Agent, or Firm—Browdy and Neimark

[57] ABSTRACT

A method of syringing reaction beads in examination of blood or the like comprises the steps of pouring a syringing liquid from a supply nozzle into a flask containing a reaction bead, withdrawing the syringing liquid with a suction nozzle to end the syringing of the beads and subsequently withdrawing the remaining syringing liquid in the flask with the suction nozzle on one side of the interior of the flask by blowing air from an air jet nozzle into the other side of the flask interior. An apparatus for syringing the reaction beads comprises a suction nozzle, a supply nozzle and an air jet nozzle or a supply/air jet nozzle provided such that they depend from a supply head and face the flask provided on a table below the supply head, free end portions of the suction nozzle and air jet nozzle being disposed on one side of the interior of the flask and on the other side of the interior of the flask, respectively.

7 Claims, 8 Drawing Sheets

FIG. 9
FIG. 10
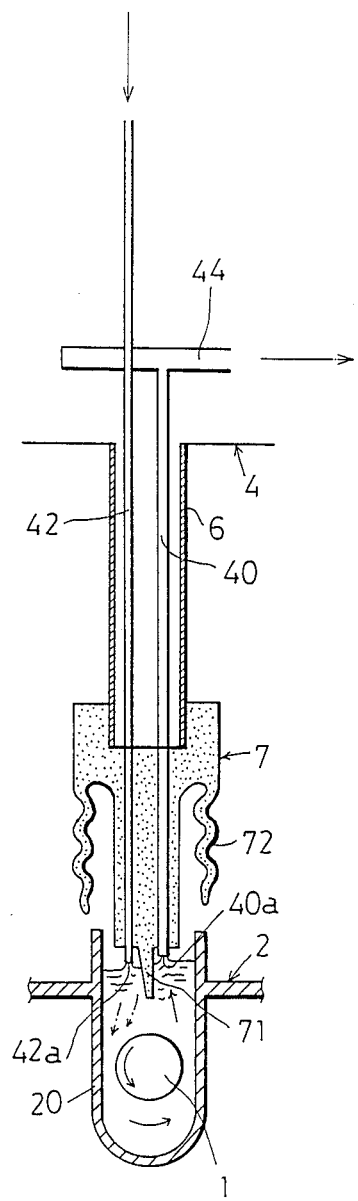
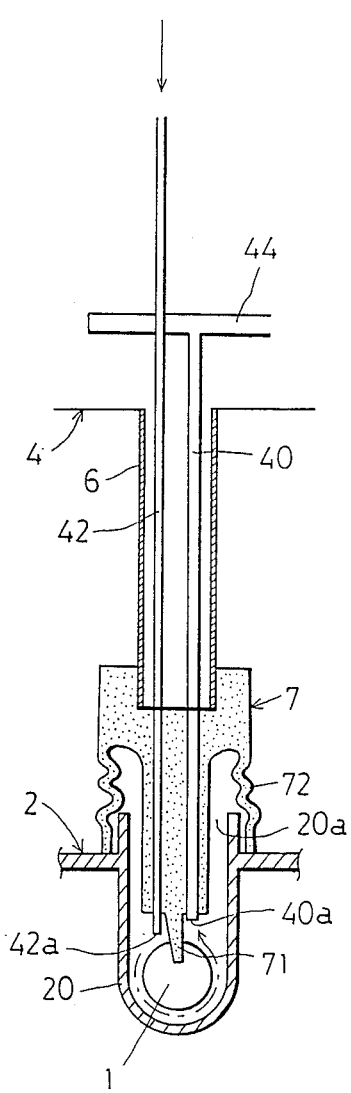

METHOD OF SYRINGING REACTION BEAD IN EXAMINATION OF BLOOD OR THE LIKE AND APPARATUS THEREOF

BACKGROUND OF THE INVENTION

1. Field of the Invention

This invention relates to improvements in a method and an apparatus for syringing reaction beads produced as a result of reaction of sample and reagent with a syringing liquid in the examination of blood or the like, which is performed using reaction beads with coating of an antibody.

2. Description of the Prior Art

The syringing of reaction beads in the examination of blood or the like is usually performed using an apparatus as shown in FIG. 1. The apparatus has a titration plate 2 which supports a plurality of flasks 20 like test tubes, into which reaction beads 1 are charged together with samples and reagent for reaction and which are arranged in a matrix array. The plate 2 is held on top of a table 3 of a body a of a syringing apparatus A. A syringing liquid is poured into the flasks 20 from supply nozzles 41 which depend from a supply head 4 mounted in the body a above the table 3. The supply head 4 also has suction nozzles 40 extending parallel to the supply nozzles 41, thereby sucking out the poured syringing liquid by the nozzles 40.

For the syringing of reaction beads in the examination of blood or the like which is performed with this apparatus, the supply nozzles 41 and suction nozzles 40 are brought into a state with their free ends intruding into the flasks 20 as shown in FIG. 2, by raising the table 3 with a lifter 30 operated by a motor M or lowering the supply head 4 by operating a lifter (not shown). In the syringing operation, the syringing liquid is supplied from the supply nozzles 41 into the flasks 20 and is also sucked by the suction nozzles 40 therefrom. During this operation, the free open ends of the suction nozzles 40 are submerged in the syringing liquid which has been supplied continuously from the supply nozzles 41 and collected in the flasks 20. In this state, the suction nozzles 40 suction out the collected syringing liquid, whereby the reaction beads 1 and flasks 20 are syringed efficiently. When the syringing process is ended, the supply of syringing liquid is stopped, and the syringing liquid remaining in the flasks 20 is sucked out by the suction nozzles 40. At this time, the level of syringing liquid in each flask 20 is progressively reduced, and each free open end of the suction nozzles 40 eventually comes out of the liquid level so that it now withdraws air together with the syringing liquid. When this occurs, the suction pressure is no longer sufficient to withdraw all the syringing liquid remaining under the reaction bead 1 on the bottom of the flask 20. Consequently, a slight amount of syringing liquid remains on the bottom of the flask 20.

When the syringed reaction bead 1 is transferred from the flask 20 into a separate test vessel for the purpose of measurement of the status of the surface of the syringed reaction bead 1 with a colorimeter or like measuring instrument, the syringing liquid remaining on the bottom of the flask 20 after end of the syringing liquid suctioning operation is poured together with the reaction bead 1 into the test vessel. This causes an error of measurement of the changes of antibodies on the surface of the reaction bead 1. For this reason, it is desired to remove the syringing liquid completely from the flask. For the disposal of the remaining syringing liquid, however, drying means can not be used because an error is caused in the measurement of the reaction bead 1 if the surface thereof becomes dry.

Therefore, it has been proposed such means to have an end portion of the suction nozzle 40 depending from the supply head 4 to be capable of being flexed by a spring member and have a shape such that it reaches the bottom of the flask 20 under the reaction bead 1. This means, however, has a problem in maintenance in that an open end 40a of the suction nozzle 40 is deformed into a irregular shape when it is used many times.

SUMMARY OF THE INVENTION

The present invention has been intended in order to preclude the various problems inherent in the prior art means, and its object is to provide novel means, with which an operation of removing a syringing liquid in flasks subsequent to the operation of syringing reaction beads in the flasks can be done quickly to completely remove the syringing liquid in the flasks.

To attain the above object of the present invention, there is provided a method of syringing reaction beads in examination of blood or the like comprising the steps of pouring a syringing liquid from a supply nozzle into a flask containing a reaction bead, withdrawing the syringing liquid with a suction nozzle to complete the syringing of the reaction beads, and subsequently withdrawing the remaining syringing liquid in the flask with the suction nozzle on one side of the interior of the flask by blowing air from an air jet nozzle into the other side of the flask interior.

BRIEF DESCRIPTION OF THE DRAWINGS

FIGS. 9 and 10 are views for explaining the operation of the same apparatus, respectively;

DESCRIPTION OF THE PREFERRED EMBODIMENTS

Figure 1:
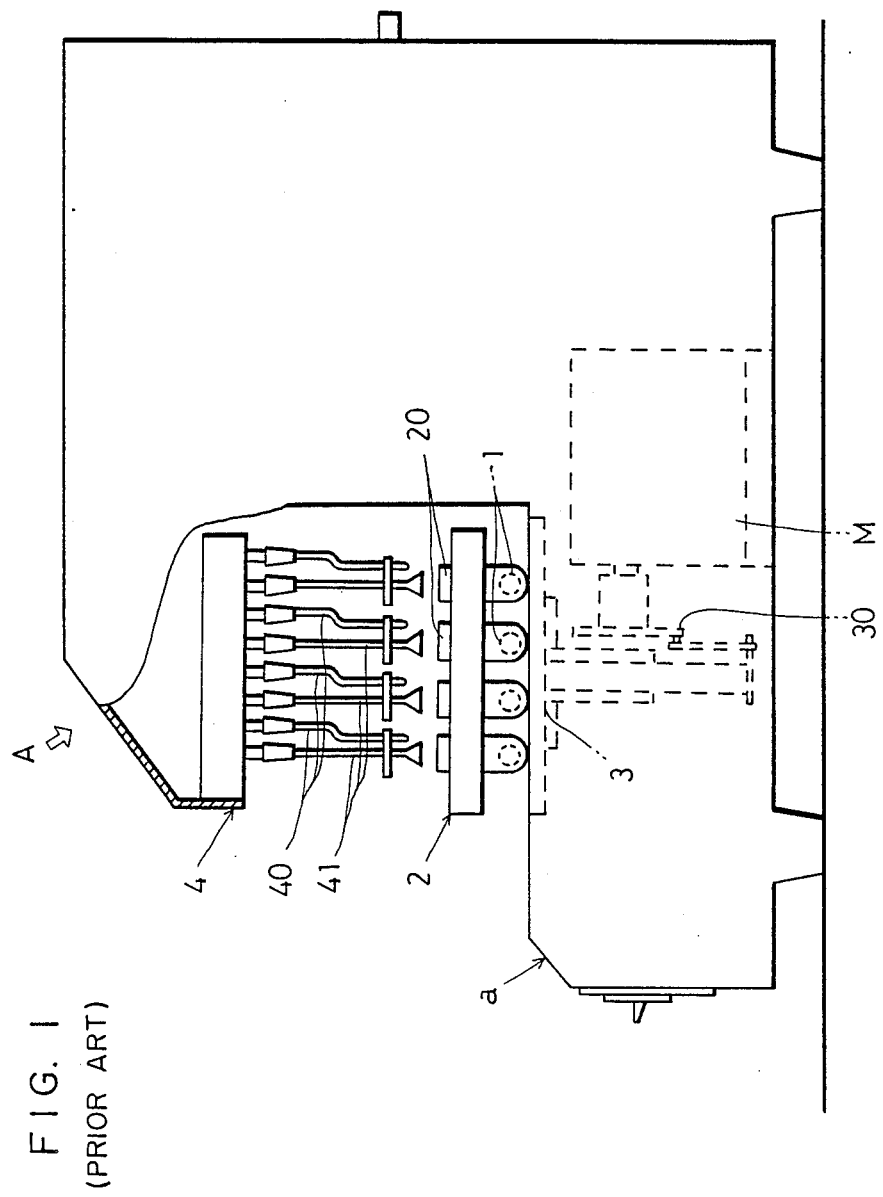
FIG. 1 is a side view showing prior art means.
Figure 2:
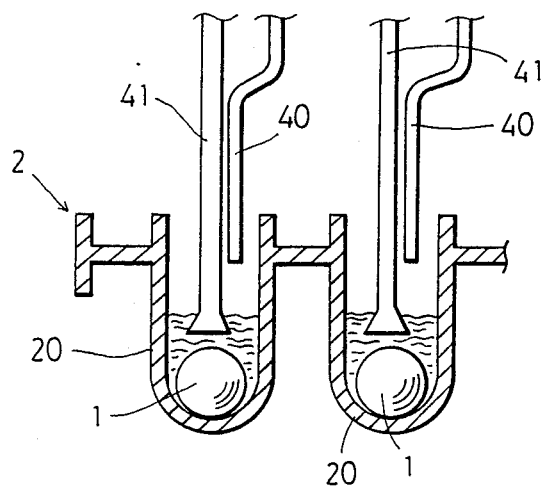
FIG. 2 is a longitudinal sectional view showing an essential part of the same means.
Figure 3:
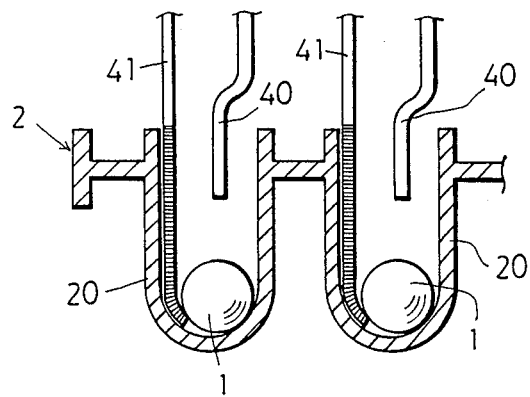
FIG. 3 is a side view showing an essential part of the prior art means.

Now, an embodiment of the present invention will be described in detail with reference to the drawings. Parts providing the same effects as with the prior art means are designated by like reference numerals.

Figure 4:
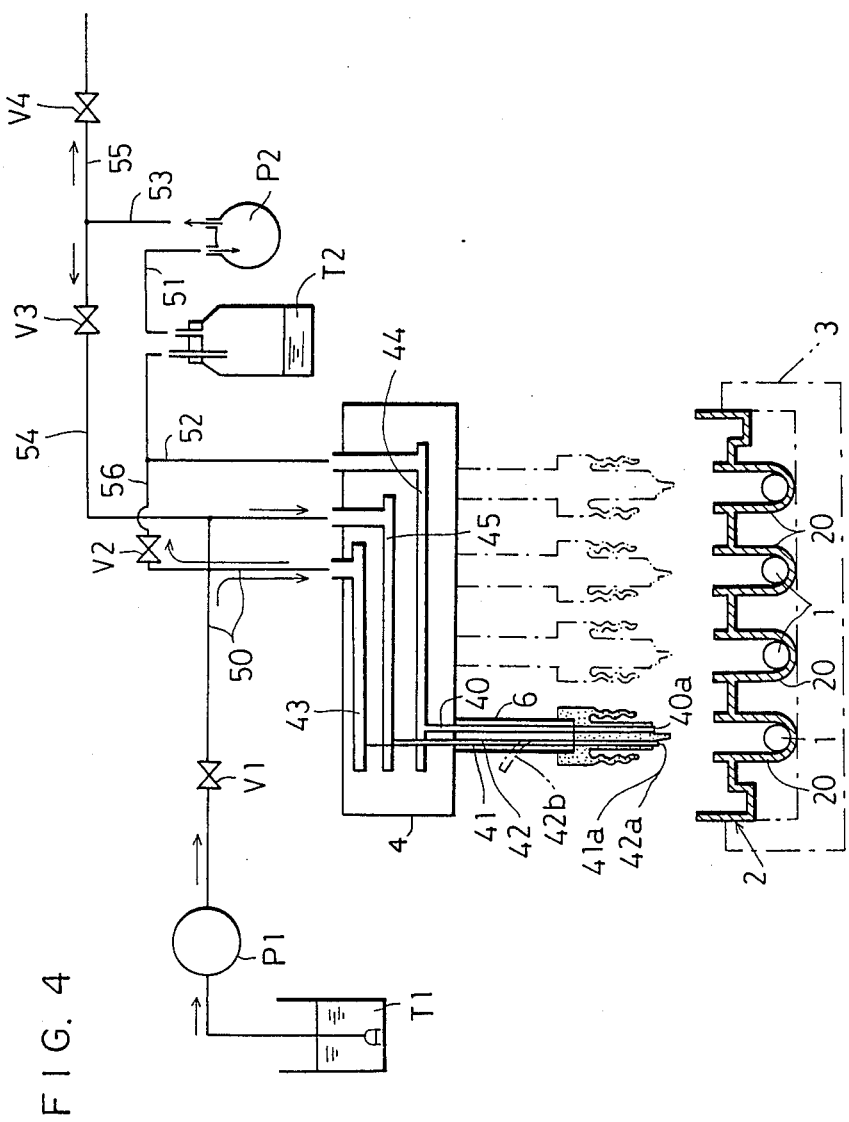
FIG. 4 is a schematic representation of an apparatus for syringing reaction beads for examination of blood or the like used to carry out a method according to the present invention.

FIG. 4 is a schematic representation, partly in section, of an essential part of an apparatus A for syringing reaction beads for examination of blood or the like used to carry out the method according to the present invention. In the Figure, reference numeral 4 designates a supply head, numeral 40 a suction nozzle, numeral 41 a supply nozzle, numeral 42 an air jet nozzle, numeral 2 a titration plate, numeral 20 a flask, and numeral 1 a reaction bead.

The supply head 4, although its support means is not shown, is supported at a fixed position or for vertical movement in a body a of the syringing apparatus A as in the prior art apparatus as shown in FIG. 1. According to the present invention, however, the supply head 4 includes a liquid chamber 43, in which is received a syringing liquid (or sample liquid) supplied from a syringing liquid (or sample liquid) tank T1 through a duct 50 by a syringing liquid (or sample liquid) pump P1, a chamber 44, which is communicated with the suction side of a compressor P2 through ducts 51 and 52, and an air chamber 45, which is communicated with the discharge side of the compressor P2 through the ducts 53 and 54. A vacuum pump for suction, which communicates with the chamber 44, may be provided separately of the compressor P2 communicating with the air chamber 45. Pluralities of suction nozzles 40, supply nozzles 41 and air jet nozzles 42 depend from the supply head 4, but they are shown only one for each. Each supply nozzle 41 has its stem communicating with the liquid chamber 43, each suction nozzle 40 has its stem communicating with the chamber 44, and each air jet nozzle 42 has its stem communicating with the air chamber 45 respectively.

In operation, a valve V1 provided on the duct 50 is opened, a valve V3 provided between the ducts 53 and 54 is closed, a valve V4 provided on the duct 55 is opened, and a valve V5 provided on the duct 56 is closed. In this state, the syringing liquid pump P1 and compressor P2 are operated. As a result, the syringing liquid is supplied through the liquid chamber 43 into the individual supply nozzles 41 to be issued from the open ends thereof. Also, the syringing liquid withdrawn by the individual suction nozzles 40 is collected in the air chamber 44 and thence recovered in a recovery tank T2 through a duct 52. When the compressor P2 is operated with the valves V1 and V4 closed and valves V3 and V2 opened, the syringing liquid collected in the liquid chamber 43 and syringing liquid withdrawn from the suction nozzles 40 are recovered in the recovery tank T2. At the same time, compressed air discharged from the discharge side of the compressor P2 is supplied to the air chamber 45 and thence distributed into the individual air jet nozzle 42 to be issued from these air jet nozzles 42.

Figure 5:
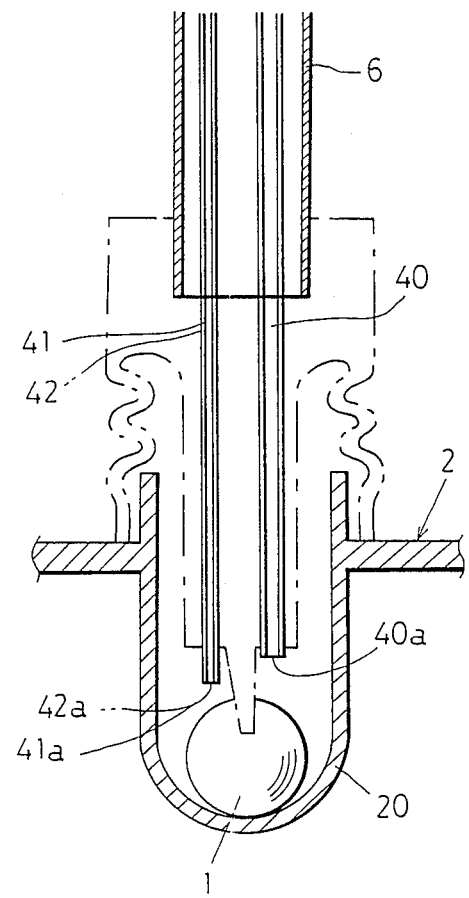
FIG. 5 is a longitudinal sectional view showing a nozzle in the same apparatus.

The inner diameter of the suction nozzle 40 is set to be greater than the inner diameter of the supply and air jet nozzles 41 and 42, so that the rate of suction by the suction nozzle 40 is higher than the rate of discharge from the supply and air jet nozzles 41 and 42. The suction, supply and air jet nozzles 40, 41 and 42 depend from the supply head 4 as sets each of three nozzles such that these nozzle sets face corresponding flasks 20 arranged in the titration plate 2 when the titration plate 2 is set on the table 3 below the supply head 4. The nozzles are brought into a state intruding into each flask 20 as shown in FIG. 5 by lowering the supply head 4 or raising the table 3. In this state, the free open end 40a of the suction nozzle 40 is located adjacent to one side of the inner wall of the flask 20, while the free open ends 41a and 42a of the supply and air jet nozzles 41 and 42 are located adjacent to the other side of the inner wall of the flask 20. In FIGS. 4 and 5, the air jet nozzle 42 is shown overlapped over the supply nozzle 41.

A cap-mounting sleeve 6 is fitted on stem portions of the three nozzles in the set, i.e., suction nozzle 40, supply nozzle 41 and air jet nozle 42, so as to surround totally an outer periphery of said three nozzles, and the stem portion (i.e., upper end) of the nozzles are secured to the underside of the supply head 4.

Figure 6:
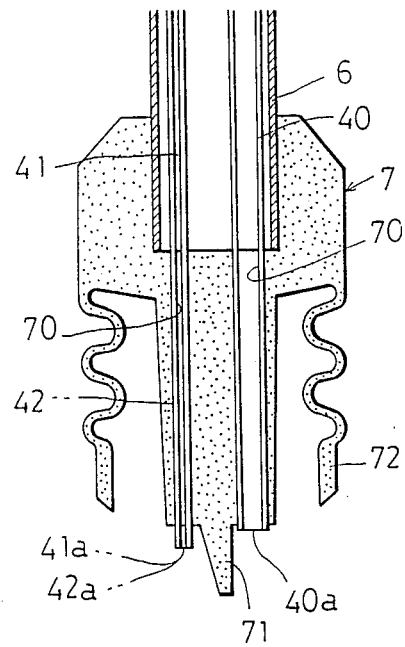
FIG. 6 is a longitudinal sectional view showing a cap in the same apparatus.
Figure 7:
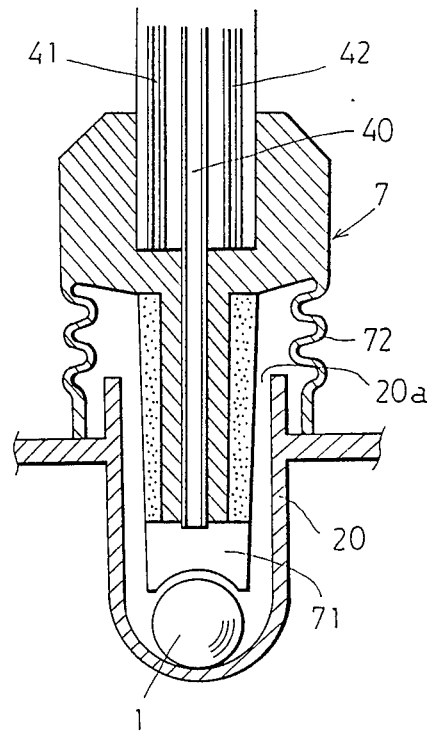
FIG. 7 is a front view showing the cap in the same apparatus.
Figure 8:
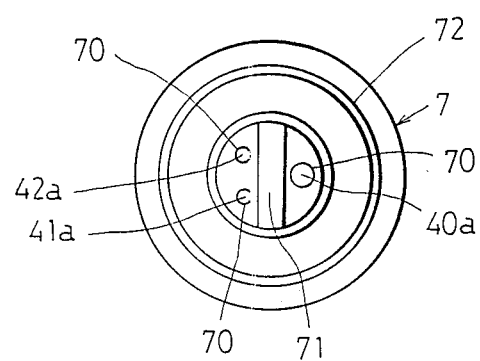
FIG. 8 is a bottom view showing the cap in the same apparatus.

A cap 7 of a soft, elastic material, e.g., rubber, is fitted on the lower end of the sleeve 6, as shown in FIG. 6. End portions of the three nozzles in the set downwardly projecting from the sleeve 6 penetrate through-holes 70 formed in the cap 7. As shown in FIG. 7, the cap 7 has an axially central partition member 71 which has a width small enough to be inserted into the flask 20 supported in the titration plate 2. The partition member 71 partitions the open end 40a of the suction nozzle 40 located on one side and the open ends 41a and 42a of the supply and air jet nozzles 41 and 42 located on the other side (FIG. 5).

The cap 7 has on the outer periphery thereof a skirt-like cover 71 capable of being extended and contracted in vertical directions like bellows. When the ends of the nozzles are inserted into the flask 20 as shown in FIG. 7, the cover 7 isolates an opening 20a of the flask 20 from the external atmosphere.

The titration plate 2 is well-known per se, and it supports a multiplicity of flasks 20 arranged at predetermined intervals. The table 3 is mounted on the body of the syringing apparatus A. The titration plate 2 is held on the table 3 such that the individual flasks 20 supported by it face the corresponding nozzles depending from the supply head 4. The table 3 is raised and lowered like the prior art means. However, it may be secured to the body in case where the supply head 4 is movable by the lift.

The embodiment of the apparatus having the above construction has the following function.

With the ends of the nozzles slightly intruded into the flasks 20 as shown in FIG. 9, the valves V2 and V3 are closed, the valves V1 and V4 are opened, and the syringing water pump P1 and compressor P2 are operated. Then, the syringing liquid in the syringing liquid tank T is distributed through the liquid chamber 43 into the individual supply nozzles 41 to be poured from the open ends 41a thereof into the individual flasks 20. The syringing liquid is withdrawn by the open ends 40a of the suction nozzles 40 to be recovered into the recovery tank T2. In this way, the inner peripheral surface of the flasks 20 and surface of the reaction beads 1 are syringed. At this time, the syringing liquid is discharged from the supply nozzle 41 on one side of the interior of the flask 20, while it is withdrawn by the suction nozzle 40 on the other side of the interior of the flask 20. Syringing liquid W flows through the flask 20 in the direction of arrow as shown in FIG. 9. The reaction bead 1 is caused to rotate in the flask 20 by the flow of the syringing liquid W. Thus, the inner peripheral surface of the flask 20 and surface of the reaction bead 1 are syringed efficiently.

When the syringing operation is ended, the syringing liquid pump P1 is stopped, the valve V1 is closed, and the valve V2 is opened, whereby the syringing liquid remaining in the liquid chamber 43 is recovered from the supply nozzle 41 into the recovery tank T2 in several seconds.

When the recovery of the remaining syringing liquid is ended, a state is brought about, in which the valves V1 and V2 are closed, the valve V3 is opened and the valve V4 is closed. Also, the nozzles are brought to be deeply inserted into the flasks 20, as shown in FIG. 10. In consequence, compressed air is discharged from the discharged side of the compressor P2 to be supplied into the air chamber 45 with the operation of the compressor P2 and thence distributed into individual air jet nozzles 42, and air is jet from the free open end 42a of each air jet nozzle 42 downwardly into one side of the interior of the flask 20 as shown by arrow in FIG. 10. At the same time, the free open end 40a of each suction nozzle 40 starts to withdraw the syringing liquid on the other side of the interior of the flask 20. Air jet from the air jet nozzle 42 is forced from one side of the interior of the flask 20 along the bottom thereof to the other side toward the free open end 40a of the suction nozzle 40 located on the other side, whereby the syringing liquid remaining in the flask 20 is raised by the jet air to be withdrawn by the suction nozzle 40.

At this time, an arcular lower end notch 71a of the partition wall 71 provided on the cap 7 is brought to the vicinity of the outer periphery of the reaction bead 1, so that it divides the interior of the flask 20 in co-operation with the reaction bead 1 into two parts, i.e., one in which air jet from the free open end 42a of the air jet nozzle 42 is jet and the other in which negative pressure is produced as air is withdrawn by the free open end 40a of the suction nozzle 40. This arrangement promotes the jetting of air from the air jet nozzle 42 and movement of the syringing liquid by the suction pressure due to the suction nozzle 40.

The skirt-like cover 72 of the cap 7 which is capable of being extended and contracted closes the space surrounding the opening 20a of the flask 20 to prevent the syringing liquid from being blown out of the flask 20 by the air jet from the air jet nozzle 42 and obtain the effect of suction from the flask 20 due to the suction nozzle 40.

The above embodiment may be with the cap 7 removed. In this case, it is impossible to obtain the advantages of the efficiency increase of movement of the syringing liquid due to partitioning of the interior of the flask 20 by the partition member 71 of the cap 7 into parts, one into which air is jet and the other in which suction pressure is received and efficiency increase of the suction pressure due to the suction nozzle 40 by closing the opening 20a of the flask 20 with the skirt-like cover 72. However, it is possible to obtain the advantage of causing the syringing liquid remaining in the flask 20 to be forced along the bottom of the flask 20 and toward the free open end 40a of the suction nozzle 40 due to the air jet nozzle 42 so that the syringing liquid can be withdrawn until there is no remaining syringing liquid in the flask 20.

Further, in this embodiment when the cap 7 provided with the skirt-like cover 72 is provided on the ends of the nozzles so as to close the gap surrounding the opening 20a of the flask 20 when removing the remaining syringing liquid in the flask 20 by suction of the suction nozzle 40, the stem 42b of the air jet nozzle 42 may not be communicated with the compressor P2, but may be exposed to external atmosphere above the cover 72 as shown by phantom lines in FIG. 4. In this case, external air is withdrawn through the air jet nozzle 42 into the flask 20 by suction pressure produced in the flask 20 closed by the cover 72 by the suction operation of the suction nozzle 40 to be issued as air jet from the free open end 42a of the air jet nozzle 42 into the flask 20.

Figure 11:
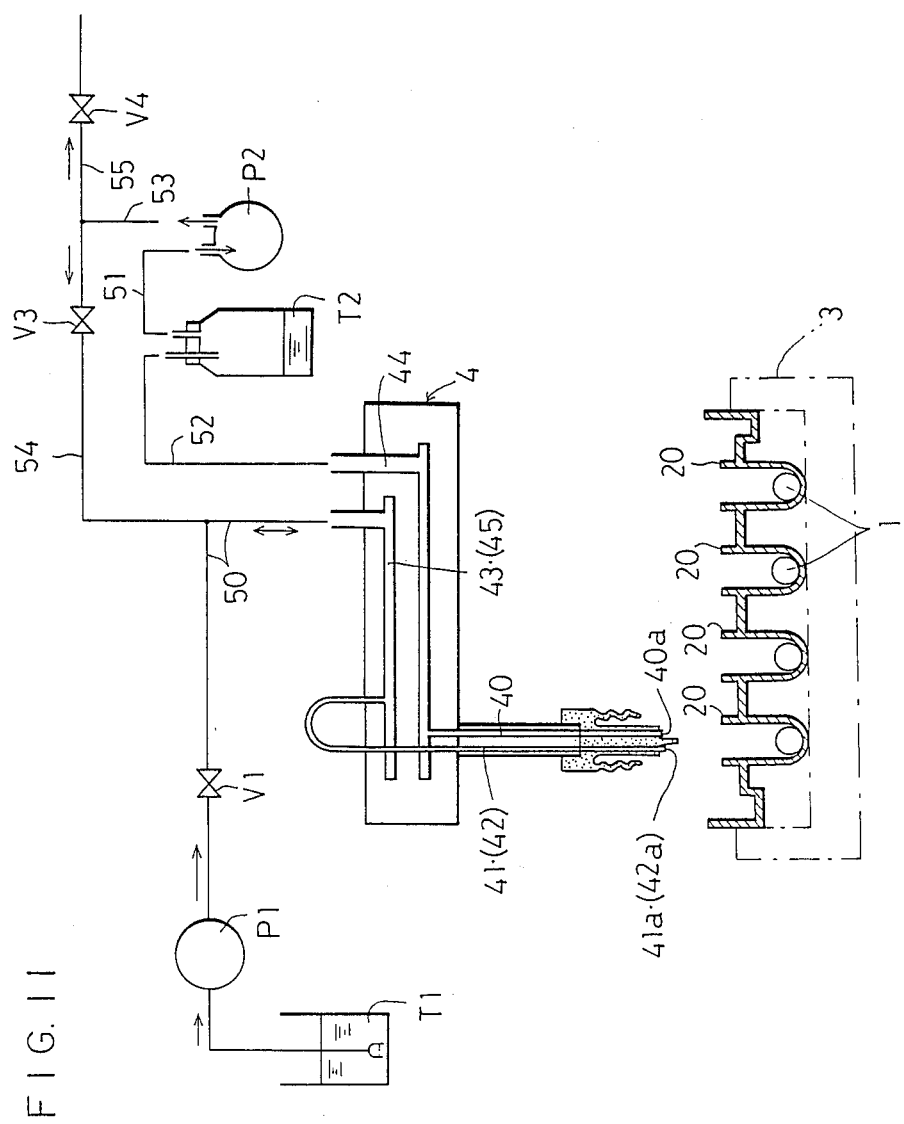
FIG. 11 is a schematic representation of a different embodiment.
Figure 12:
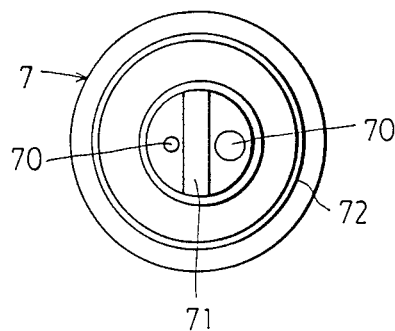
FIG. 12 is a bottom view showing a cap in the same apparatus shown in FIG. 11.
Figure 13:
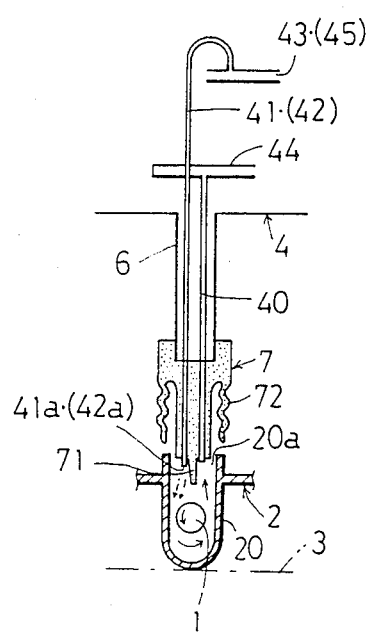
FIGS. 13 and 14 are views for explaining the operation of the same apparatus shown in FIG. 11, respectively.

FIG. 11 shows a different embodiment of the apparatus. In this embodiment, the liquid chamber 43 and air chamber 45 are provided as a common chamber in the supply head 4, and the supply nozzle 41 and air jet nozzle 42 are provided as a common nozzle. Therefore, the duct 56 and valve V2 in the embodiment shown in FIG. 4 are omitted. The cap 7 fitted on an end portion of the sleeve 6, as shown in FIG. 12, as two through holes 70, i.e., one, in which the supply nozzle 41 which also serves as the air jet nozzle 42 is fitted, and one, in which the suction nozzle 40 is fitted. The rest of the construction of the embodiment is the same as the embodiment of FIG. 4, and like parts are designated by like reference numerals and are not described.

In this embodiment, with the ends of the nozzles held slightly inserted into the flasks 20 through the openings 20a thereof, and with the valves V1 and V4 held open and the valve V3 closed, the syringing liquid pump P1 and compressor P2 are operated. In consequence, the inner wall surface of the flask 20 and surface of the reaction bead 1 are syringed in the same manner as in the embodiment of FIG. 4.

Figure 14:
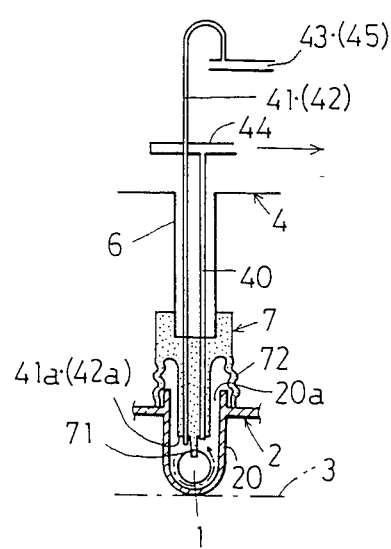

When the syringing operation is ended, the syringing liquid pump P1 is stopped, the valve V1 is closed, and the nozzles are brought to a state that their ends are deeply inserted into the flask 20 as shown in FIG. 14. In this state, the valve V3 is opened, and the valve V4 is closed. As a result, compressed air discharged from the discharge side of the compressor P2 is forced into the liquid chamber 43 with continual operation of the compressor P2. The remaining syringing liquid thus is forced out from each supply nozzle 41 into the flask 20, and compressed air continually forced out into the liquid chamber 43 is distributed through the liquid chamber 43 as the air chamber 45 into the individual supply nozzles 41. The supply nozzles 41 now serve as the air jet nozzles 42, thus causing air to be jet from the free open end 42a of each air jet nozzle 42 into one side of the interior of the flask 20. At the same time, on the other side of the interior of the flask 20 the suction nozzle 40 effects suction operation, and the syringing liquid which is forced up toward the free open end 40a of the suction nozzle 40 by the air jet blown out from the air jet nozzle 42 is withdrawn. In this way, even the syringing liquid that will remain under the reaction bead 1 on the bottom of the flask 20 is completely removed as in the previous embodiment of FIG. 4.

Again this embodiment may be used without the cap 7.

As has been described in the foregoing, according to the present invention the syringing liquid is poured from the supply nozzle into the flask containing the reaction bead and is withdrawn from the flask by the suction nozzle. When removing the syringing liquid remaining in the flask after the reaction bead has been syringed, air is blown from the air jet nozzle into one side of the interior of the flask, causing the syringing liquid in the flask to be forced through the underside of the reaction bead positioned on the bottom of the flask and then upwards on the other side of the flask interior to be withdrawn by the suction nozzle from the other side. Thus, it is possible to completely remove even the syringing liquid which would otherside remain under the reaction bead on the flask bottom.

What is claimed is:

1. An apparatus for exposing reaction beads to a fluid, comprising:
   bead containing means for holding a reaction bead, comprising a flask;
   support means for supporting said flask;
   a liquid supply nozzle for supplying liquid to a reaction bead in said flask supported by said holding means, said liquid supply nozzle having one free end portion and one terminal end portion;
   a suction nozzle, distinct from said liquid supply nozzle, for suctioning liquid out from said flask, said suction nozzle having one terminal end portion and one free end portion;
   an air jet nozzle for blowing air into said flask simultaneously with the suctioning of liquid out from said flask by said suction nozzle, said air jet nozzle having one free end portion and one terminal end portion;
   means for simultaneously positioning said free end portions of said suction nozzle and said air jet nozzle within said flask so that said free end of said air jet nozzle is positioned on one side of said flask and said free end of said suction nozzle is positioned on an opposite side of said flask; and
   means for blowing air into said flask through said air jet nozzle simultaneously with said suctioning of liquid out from said flask by said suction nozzle.

2. The apparatus of claim 1, wherein said free end portion of said suction nozzle, said free end portion of said liquid supply nozzle, and said free end portion of said air jet nozzle are simultaneously insertable within said flask.

3. The apparatus of claim 1, wherein each of the terminal and portions of all of said nozzles depend from one supply head positioned above an open end of said flask and said supply head, with said nozzles fixed thereto, is movable relative to said open end of said flask.

4. The apparatus of claim 3, wherein a partition extends between and below a bottommost tip of said free end portion of said air jet nozzle and a bottommost tip of said free end portion of said suction nozzle.

5. The apparatus of claim 4, wherein a bottom end of said partition is of arcuate cross-section.

6. The apparatus of claim 3, further comprising a cover surrounding the free end portions of said nozzles for closing the open end of said flask when said air jet is blowing air therein.

7. The apparatus of claim 6, wherein said terminal end portion of said air jet nozzle is open to ambient atmospheric pressure.

* * * * *